United States Patent [19]
Garnjost et al.

[11] Patent Number: 5,903,077
[45] Date of Patent: May 11, 1999

[54] MODULAR VIBRATORY FORCE GENERATOR, AND METHOD OF OPERATING SAME

[75] Inventors: Kenneth D. Garnjost, Buffalo; Gonzalo J. Rey, Batavia, both of N.Y.

[73] Assignee: Moog Inc., East Aurora, N.Y.

[21] Appl. No.: 09/026,290

[22] Filed: Feb. 19, 1998

Related U.S. Application Data

[63] Continuation of application No. 08/531,478, Sep. 21, 1995, abandoned.

[51] Int. Cl.[6] .................................................... F16F 15/00
[52] U.S. Cl. ............................................. 310/81; 310/51
[58] Field of Search ....................... 310/81, 51; 361/761; 74/573, 574; 248/554, 638

[56] References Cited

U.S. PATENT DOCUMENTS 3,208,292  9/1965  Austin et al. .................................. 74/61
5,005,439  4/1991  Jensen et al. ................................. 74/574

*Primary Examiner*—Thomas M. Dougherty
*Attorney, Agent, or Firm*—Phillips, Lytle, Hitchcock, Blaine & Huber LLP

[57] ABSTRACT

A modular vibratory force generator (10) is adapted to be mounted on a helicopter fuselage (11) and operated to selectively apply a controllable vibratory force ($F_R$) thereto. The improved generator includes a plurality of force-generating modules (12, 12) and a closed-loop servocontroller (13). Each module has a pair of counter-rotating eccentric masses (20, 21) that are arranged to exert a fixed-amplitude variable-phase individual force at spaced locations on the fuselage. These individual forces ($F_1$, $F_2$) combine to exert a controllable-amplitude resultant vibratory force ($F_R$) on the structure. The servocontroller is adapted to be supplied with a single sinusoidal control signal and is operative to cause the frequency and phase of the resultant vibratory force to be identical to the frequency and phase of the control signal and to cause the amplitude of the resultant vibratory force to be proportional to the amplitude of the control signal.

9 Claims, 3 Drawing Sheets

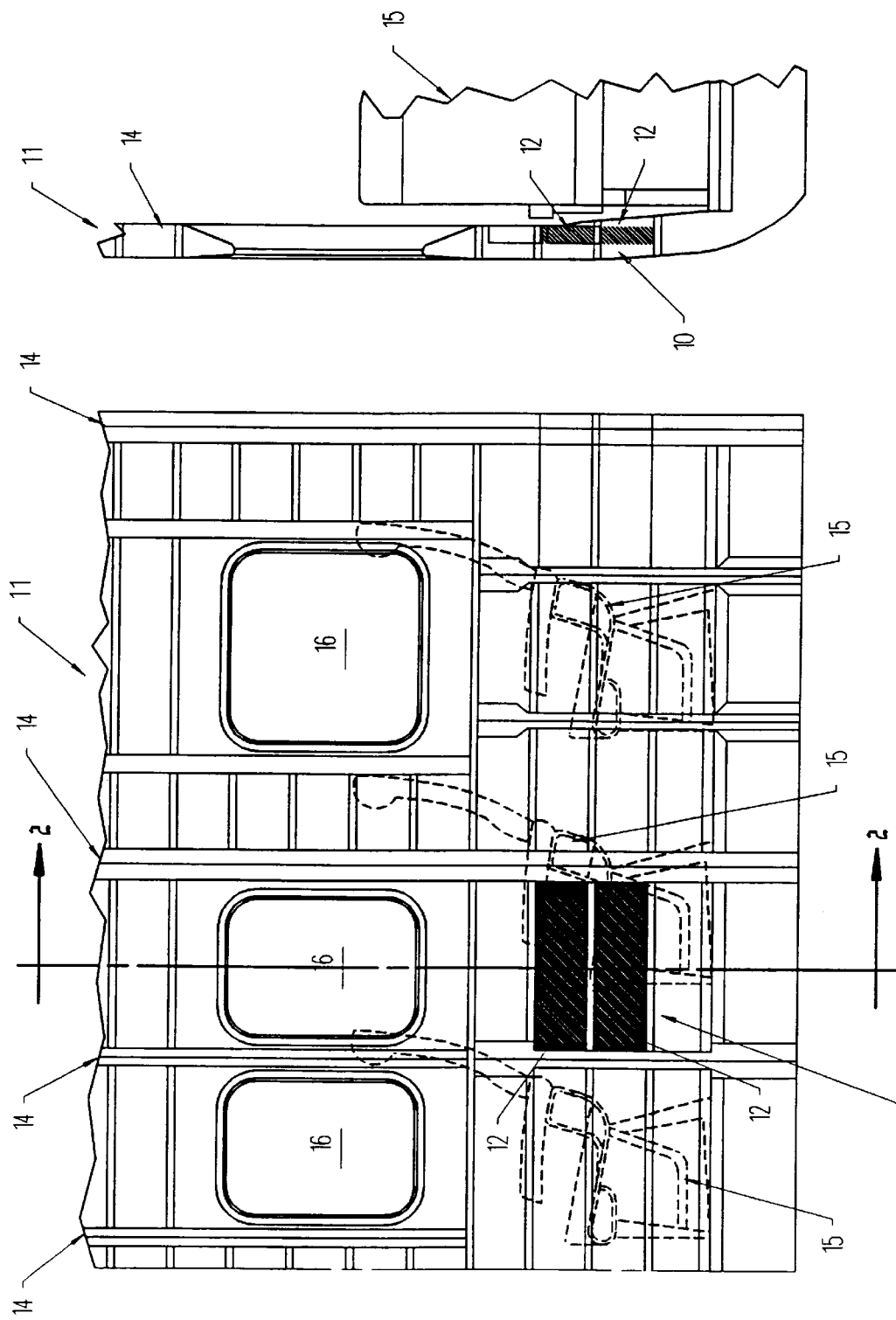

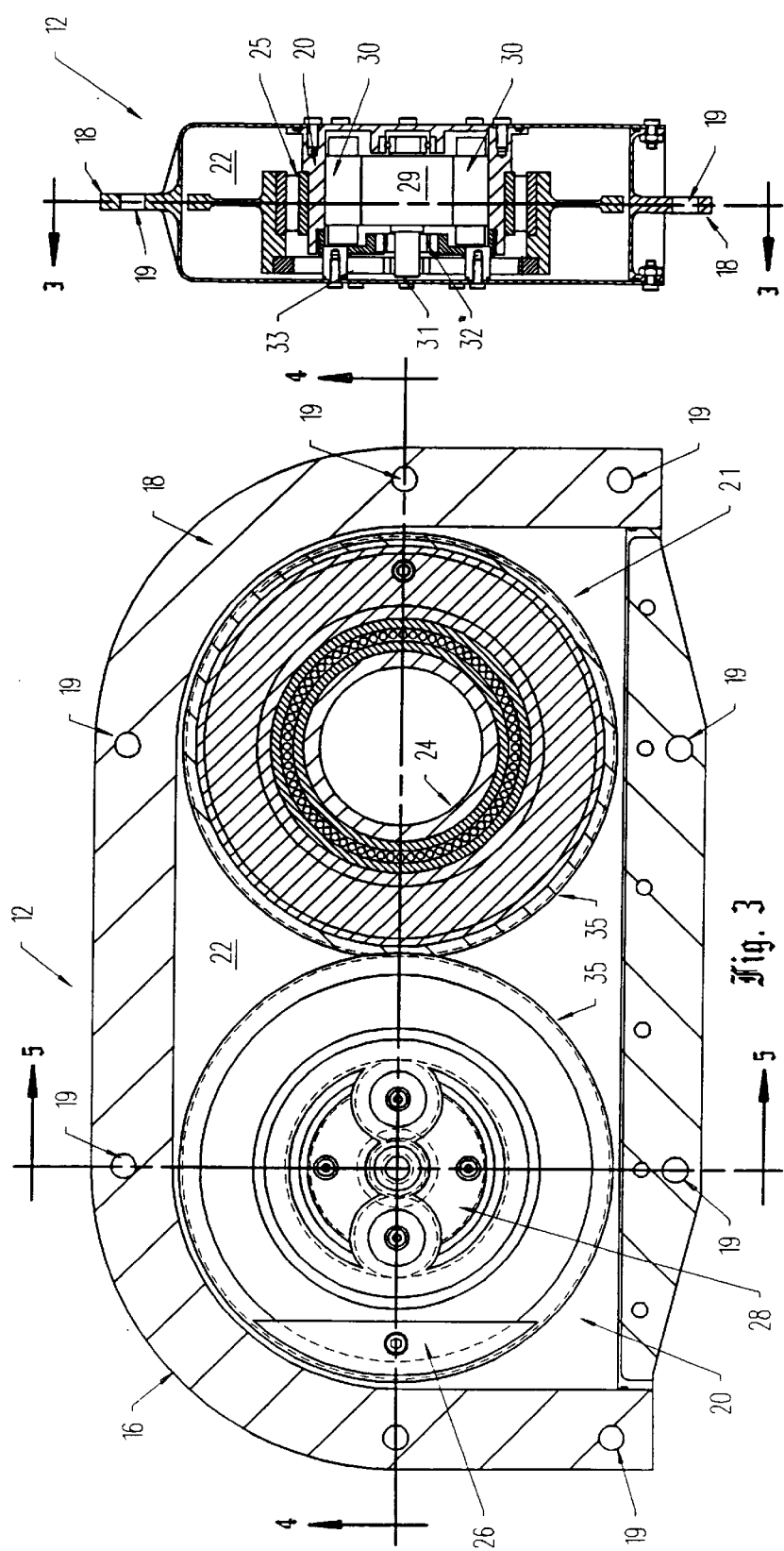
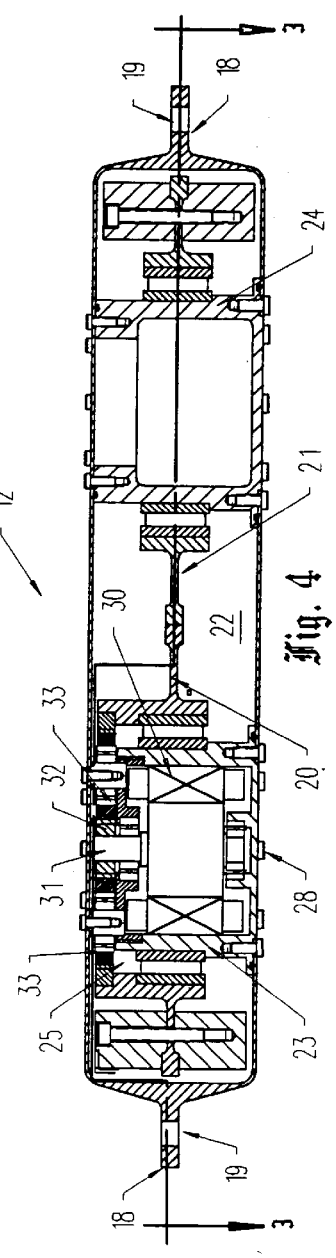

MODULAR VIBRATORY FORCE GENERATOR, AND METHOD OF OPERATING SAME

CROSS-REFERENCE TO RELATED APPLICATIONS

This application is a continuation of U.S. patent application Ser. No. 08/531,478, filed Sep. 21, 1995, now abandoned.

TECHNICAL FIELD

The present invention relates generally to the field of vibratory force generators, and, more particularly, to an improved vibratory force generator that may be used to selectively produce counter-vibrations to reduce the overall level of vibration in a structure.

BACKGROUND ART

Active counter-vibration devices have been used in helicopters to oppose and cancel high levels of vibration transmitted from the rotor to the fuselage. In U.S. Pat. No. 4,819,182, electrohydraulic servoactuators are arranged in parallel with resilient mountings between the rotors and the fuselage, and act to vibrate the gear box inertially to generate cancelling forces.

However, in other helicopters, it may be impractical to incorporate resilient mountings between the rotors and the fuselage. In such instances, it may be necessary to employ mass elements that can be selectively vibrated to generate the desired counter-vibrations. These mass elements may be "parasitic" in the sense that they are not used for anything other than to produce such counter-vibration. Obviously, it is important that the added weight of such elements be kept to a minimum, while being able to produce the required levels of vibratory force.

The actively-controlled generation of counter-vibration forces by means of inertial reaction is addressed in Applicants' copending U.S. patent application Ser. No. 08/052,474, filed Nov. 23, 1993. In the apparatus disclosed therein, servo-driven mass-spring systems are operated at or near resonant frequencies to produce large mass motions, and hence large forces, with relatively small weight. However, the force-generating capabilities of such apparatus may be limited by practical limits of the spring stress created during such large-amplitude mass motions.

Higher mass acceleration levels can practicably be achieved by rotating a given mass eccentrically at the desired vibrational frequency, to produce a rotating force vector. It is known to use two counter-rotating eccentric masses to produce a linearly-oscillating force, similar to that developed by a mass vibrating on a spring, by summing two rotating vectors. The orthogonal components of these vectors add along a line of action, and cancel at right angles to it. The amplitude control necessary for counter-vibration applications requires that the oscillatory force produced by a second pair of counter-rotating eccentric masses be vector-summed with the similar oscillatory force produced by a first pair. The combined vibratory force amplitude can be adjusted from zero to four times the force produced by a single rotor by means of variable relative phase control. A mechanical implementation of such a device is disclosed in U.S. Pat. No. 3,208,292, in which two pairs of counter-rotating eccentric masses are coupled through an adjustable differential gearing arrangement to a common drive motor. This gearing is used to vary the phase relationship between the individual forces produced by the mass pairs, to control the amplitude of the resultant vector-summed force.

A similar device using a cluster of eccentric rotors, each driven by a separate electric servomotor, is disclosed in U.S. Pat. No. 5,005,439. This device produces an oscillating force vector in a plane which can not only be controlled in amplitude, but which can also be controlled in direction. It takes advantage of motor rotation angle control, combined with a nested mechanical packaging arrangement, to produce a device having controllable oscillatory force output. However, this device appears to be complex, bulky and awkward to mount on a structure.

Applicants' U.S. Pat. No. 5,347,884 also discloses rotating eccentric masses driven by independent electric servo-motors with absolute rotary angle control. However, this invention utilizes a plurality of co-rotating eccentric masses to generate a rotating force vector, and uses a rotating couple in order to cancel the effect of a rotational unbalance disturbance on a structure. The significance of this disclosure is to illustrate the advantage of separately-controlled servomotor-driven motors to permit mounting an array of rotating vector devices at effective locations on a structure. See also, European Patent Application No. 88 400 904.4, published Oct. 18, 1989.

DISCLOSURE OF THE INVENTION

With parenthetical reference to the corresponding parts, portions or surfaces of the disclosed embodiment, merely for purposes of illustration and not by way of limitation, the present invention, in one aspect, provides an improved modular counter-rotating eccentric-mass force generator (10) that is adapted to be mounted on a structure (11) and selectively operated to apply a controllable vibratory force thereto. The improved force generator broadly includes: a plurality of modules (12, 12) adapted to be mounted on the structure (11), each module being operatively arranged to generate a fixed-amplitude variable-phase individual vibratory force ($F_1$, $F_2$) on the structure at spaced locations thereon, the individual forces combining to exert a controllable-amplitude resultant vibratory force ($F_R$) on the structure; and servocontrol means (13) adapted to be supplied with a single sinusoidal control signal and operative to cause the frequency and phase of said resultant vibratory force ($F_R$) to be identical to the frequency and phase of said control signal and to cause the amplitude of said resultant vibratory force to be proportional to the amplitude of the control signal.

In another aspect, the invention provides an improved method of reducing externally-excited vibrations in a structure (11), which method comprises the steps of: mounting a plurality of modular counter-rotating eccentric mass force generators (12, 12) on the structure at points capable of being vibrated at the exciting frequency; generating signals representative of dynamic accelerations at a plurality of locations on the structure; supplying such signals to processing means which create unique command signals to each of said force generators; and continuously adjusting the magnitude and phase of the vibratory forces produced by said generators in response to said command signals so as to optimally reduce the overall level of structural vibration at the exciting frequency.

Accordingly, the general object of this invention is to provide an improved counter-rotating eccentric-mass force generator.

Another object is to provide such an improved force generator that is adapted to be mounted as a module on a structure.

Another object is to provide such a force generator that is adapted to selectively apply a controllable vibratory force to a structure.

Still another object is to provide an improved method of reducing externally-excited vibrations in a structure.

These and other objects and advantages will become apparent from the foregoing and ongoing written specification, the drawings and the appended claims.

BRIEF DESCRIPTION OF THE DRAWINGS

FIG. 1 is a fragmentary elevational view looking at the inside wall of a helicopter fuselage (with the inner skin removed), this view showing two force generating modules as being disposed in vertical relation between lifting frames of the fuselage.

FIG. 2 is a fragmentary vertical sectional view thereof, taken generally on line 2—2 of FIG. 1.

FIG. 3 is a fragmentary longitudinal vertical sectional view thereof, taken generally on line 3—3 of FIG. 2, of the upper module.

FIG. 4 is a fragmentary longitudinal horizontal sectional view thereof, taken generally on line 4—4 of FIG. 3.

FIG. 5 is a fragmentary transverse vertical sectional view thereof, taken generally on line 5—5 of FIG. 3.

DESCRIPTION OF THE PREFERRED EMBODIMENTS

Figure 6:
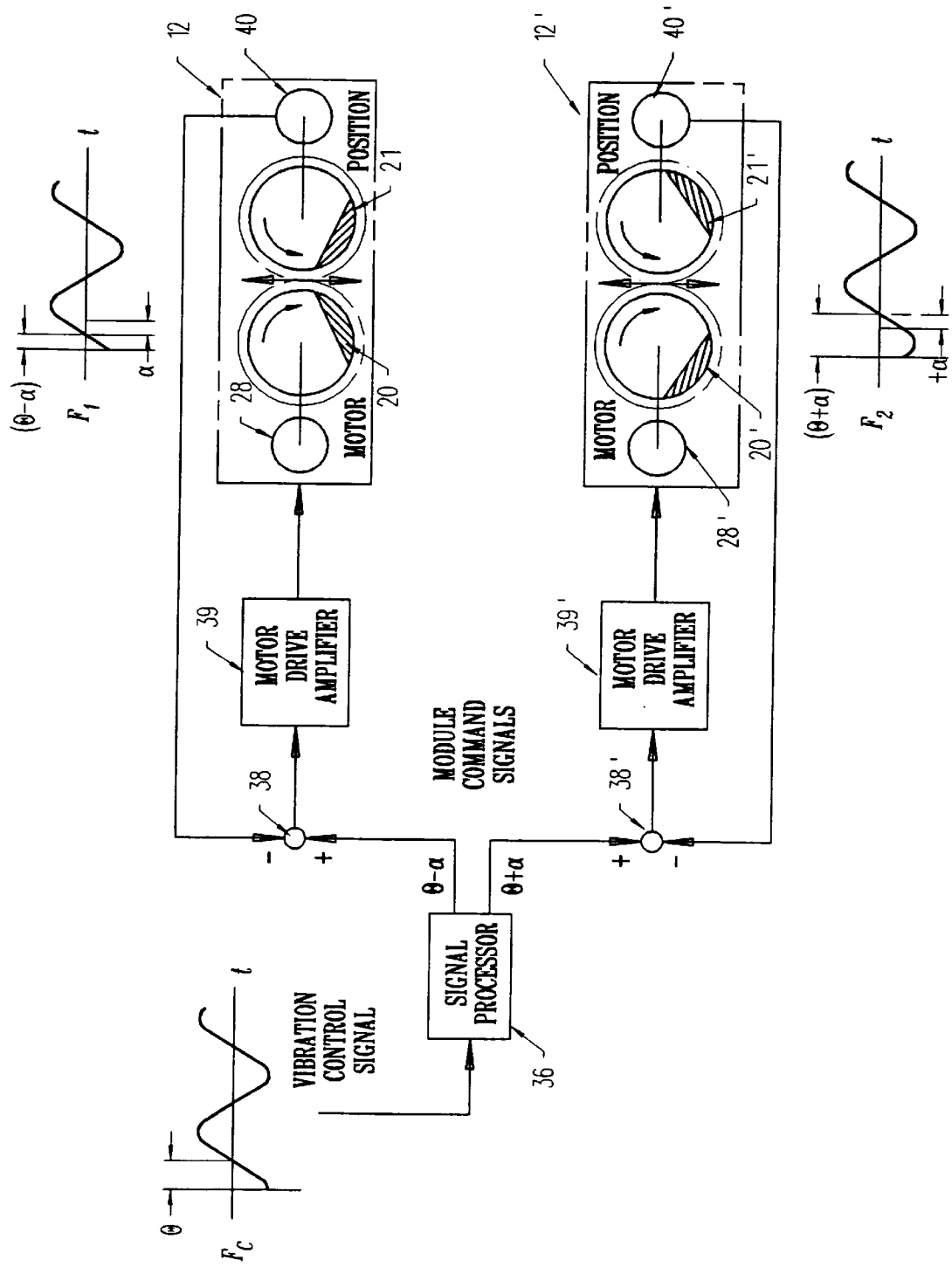
FIG. 6 is a schematic block diagram showing the servocontrol means for controlling the operation of the two modules.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1 and 2 thereof, the present invention broadly provides an improved modular counter-rotating eccentric-mass force generator, generally indicated at 10, that is adapted to be mounted on a structure, such as the fuselage 11 of a helicopter, and which is adapted to selectively apply a controllable vibratory force to the fuselage. In the illustrated form, the force generator is adapted to exert a counter-vibration on the fuselage, to oppose and substantially cancel the vibrations transmitted from the rotor (not shown) to the fuselage.

The improved force generator 10 is shown as broadly including a plurality of modules, severally indicated at 12, that are adapted to be mounted on the structure, and servocontrol means, generally indicated at 13 (FIG. 6). Each module is operatively arranged to generate a fixed-amplitude variable-phase individual vibratory force on the fuselage at its location thereon. These two modules are shown as being vertically separated in FIGS. 1 and 2. Hence, these individual forces combine to exert a controllable-amplitude resultant vibratory force on the structure.

As best shown in FIG. 6, the servocontrol means 13 is adapted to be supplied with a single sinusoidal control signal, and is operative to cause the frequency and phase of the resultant vibratory force to be identical to the frequency and phase of the control signal and to cause the amplitude of the resultant vibratory force to be proportional to the amplitude of the control signal.

In FIGS. 1 and 2, the helicopter fuselage is shown as having a plurality of horizontally-spaced vertical lifting frames, severally indicated at 14, and a plurality of chairs (indicated in phantom at 15) resting on the fuselage floor. The fuselage is also shown as having a plurality of windows, severally indicated at 16. The spacing-between the lifting frames is maintained via a plurality of intermediate horizontally-elongated and vertically-spaced stringers.

Referring now to FIGS. 3–5, each module 12 is shown as having a pair of geared eccentric masses 20, 21, journalled for rotation within a chamber 22 provided in housing 16. Housing 16 is shown as being a horizontally-elongated substantially-rectangular member having an outwardly-extending peripheral flange 18 provided with a plurality of mounted holes, severally indicated at 19. The housing has two tubular support shafts therein, these being indicated at 23, 24, respectively. Eccentric mass 20 is journalled for rotation about tubular hub 23 via a roller bearing 25. Similarly, eccentric mass 21 is journalled for rotation about tubular hub 24 via another roller bearing, again indicated at 25. The off-center mass is indicated at 26.

A motor, generally indicated at 28, is operatively arranged within left hub 23. This motor has a rotor 29 surrounded by a coil 30, and has a rotatable output shaft 31. A pinion 32 is mounted on output shaft 31, and engages two idler gears, severally indicated at 33 at the three o'clock and nine o'clock positions, respectively (FIG. 4). These idler gears engage a ring gear 34 on eccentric mass 20. Hence, motor 28 may be selectively operated to cause output shaft and pinion gear 32 to rotate. This causes corresponding rotation of idler gears 33, 33 and also causes the eccentric mass 20 to rotate about the axis of hub 23. Eccentric masses 20, 21 have outer peripheral teeth 35, 35 that are in constant engagement with one another. Hence, rotation of left mass 20 causes corresponding counter rotation of right mass 21. The mass eccentricities are normally located 180° apart. Thus, motor 28 causes eccentric masses 20, 21, which are coupled by gear teeth 35, 35, to counter-rotate relative to one another. The two modules are arranged in vertically-spaced relation to one another, such that they will severally generate forces which act in the vertical, but not the horizontal, direction in substantially the same plane.

Referring now to FIG. 6, a sinusoidal control signal, having an amplitude A and a phase angle θ, is first supplied to a signal processor 36. This produces two output signals, θ−α and θ+α, respectively. The first of these signals is supplied as a positive input to a summing point 38. The error signal from summing point 38 is then provided to an amplifier 39 and then to the motor 28 of the first module 12. Eccentric masses 20, 21 counter rotate to produce an oscillating vertical force $F_1$ having a phase angle of θ−α. The angular position of the eccentric masses is monitored via a position transducer or resolver 40, which provides a negative feedback signal via line 41 to summing point 38.

The signal processor also produces a second signal, θ+α, which is supplied as a positive input to a second summing point 38'. The error signal from summing point 38' is supplied to a motor drive amplifier 39', and then to the motor 28' of a second module 12'. Motor 28' causes eccentric masses 20', 21' to rotate, again to produce a vertical force $F_2$. However, whereas force $F_1$ was offset by a phase angle of θ−α, force $F_2$ is offset from the origin by a phase angle of θ+α. The position of the two eccentric masses 20', 21' is sensed by a resolver 40', which supplies a negative feedback signal via line 41' to summing point 36'.

Therefore, the inventive force generator is adapted to be mounted on a structure for selectively applying a controllable vibratory force to the structure. The force generator includes a plurality (i.e., two or more) of modules that are adapted to be mounted on the structure. Each module is operatively arranged to generate a fixed-amplitude variable-phase individual vibratory force on the structure at spaced locations thereon. The individual forces combine to exert a controllable-amplitude resultant vibratory force on the structure. The improved force generator also includes servocontrol means adapted to be supplied with a single sinusoidal control signal and operative to cause the frequency and phase of the resultant vibratory force to be identical to the frequency and phase of the control signal, and to cause the amplitude of the resultant vibratory force to be proportional to the amplitude of the control signal.

In use, the invention provides an improved method of reducing externally-excited vibrations in a structure, which method comprises the steps of: mounting a plurality of modular counter-rotating eccentric-mass force generators on the structure at points capable of being vibrated at the exciting frequency, generating signals representative of dynamic accelerations and a plurality of locations on the structure, applying such signals to processing means which create unique command signals to each of the force generators, and continuously adjusting the magnitude and phase of the vibratory forces produced by the generators in response to the command signals so as to optimally reduce the overall level of structurally vibration at the exciting frequency. The modules may be mounted on the structure so as to produce a horizontal force, or a force have both horizontal and vertical components. The two modules need not necessarily produce individual forces in a common plane. Alternatively, they may be arranged side-by-side, as desired. Still further, each module could have two separate motors, each powering its own eccentric mass, rather than having a single motor drive two coupled masses.

Of course, numerous changes and modifications may be made. The structure of the eccentric masses may be readily varied. While it is presented preferred that the two masses be coupled together via peripheral gear teeth, with a single electric motor operating both, this arrangement may also be changed or varied at will. The housing may take other shapes and forms as well.

Therefore, while the presented-preferred form of the improved modular vibratory force generator has been shown and described, and several modifications thereof discussed, persons skilled in this art will readily appreciate the various additional changes and modifications may be made without departing from the spirit of the invention, as defined and differentiated by the following claims.

What is claimed is:

1. A modular counter-rotating eccentric-mass force generator adapted to be mounted on a structure for selectively applying a controllable vibratory force thereto, comprising:

a plurality of modules adapted to be mounted on said structure, each module being operatively arranged to generate a fixed-amplitude variable-phase individual vibratory force on said structure at spaced locations thereon, said individual forces combining to exert a controllable-amplitude resultant vibratory force on said structure, each module consisting of a housing adapted to transmit vibratory force to said structure, two rotors rotatably mounted on said housing, each rotor having an eccentric center-of-mass, coupling means including gear teeth on the outer periphery of each rotor in meshed engagement for causing said rotors to rotate in opposite angular directions with a fixed angular phase relationship, and a single motor mounted on said housing and arranged within one of said rotors for rotating the rotors of the associated module; and servocontrol means adapted to be supplied with a single sinusoidal control signal and operative to cause the frequency and phase of said resultant vibratory force to be identical to the frequency and phase of said control signal and to cause the amplitude of said resultant vibratory force to be proportional to the amplitude of said control signal.

2. The modular counter-rotating eccentric-mass force generator as set forth in claim 1 wherein said rotors are adapted to be rotated about parallel axes, and wherein said fixed angular phase relationship is such that said module generates an oscillatory force acting along a line perpendicular to a plane containing said rotor axes.

3. The modular counter-rotating eccentric-mass force generator as set forth in claim 1 wherein said rotors are identical.

4. The modular counter-rotating eccentric-mass force generator as set forth in claim 1 wherein said motor has an output shaft which is concentric with the axis of rotation of the associated rotor.

5. The modular counter-rotating eccentric-mass force generator as set forth in claim 1 wherein said motor is electric.

6. The modular counter-rotating eccentric-mass force generator as set forth in claim 1 and further comprising an angular position transducer arranged to sense the absolute angular position of one of said rotors, and to supply such sensed angular position as a feedback signal.

7. The modular counter-rotating eccentric-mass force generator as set forth in claim 6 wherein said servocontrol means has a power amplifier adapted to drive said motor, and further comprising a position feedback loop closed about said amplifier and motor such that an error signal between said command and feedback signals is driven toward zero.

8. The modular counter-rotating eccentric-mass force generator as set forth in claim 7 wherein said servocontrol means further comprises signal processing means operatively arranged to provide command signals to each of said position feedback loops as functions of said control signal.

9. The modular counter-rotating eccentric-mass force generator as set forth in claim 8 wherein the command signal provided to one module is different in phase from the command signal provided to another module.

* * * * *